United States Patent Office 2,907,409
Patented Oct. 6, 1959

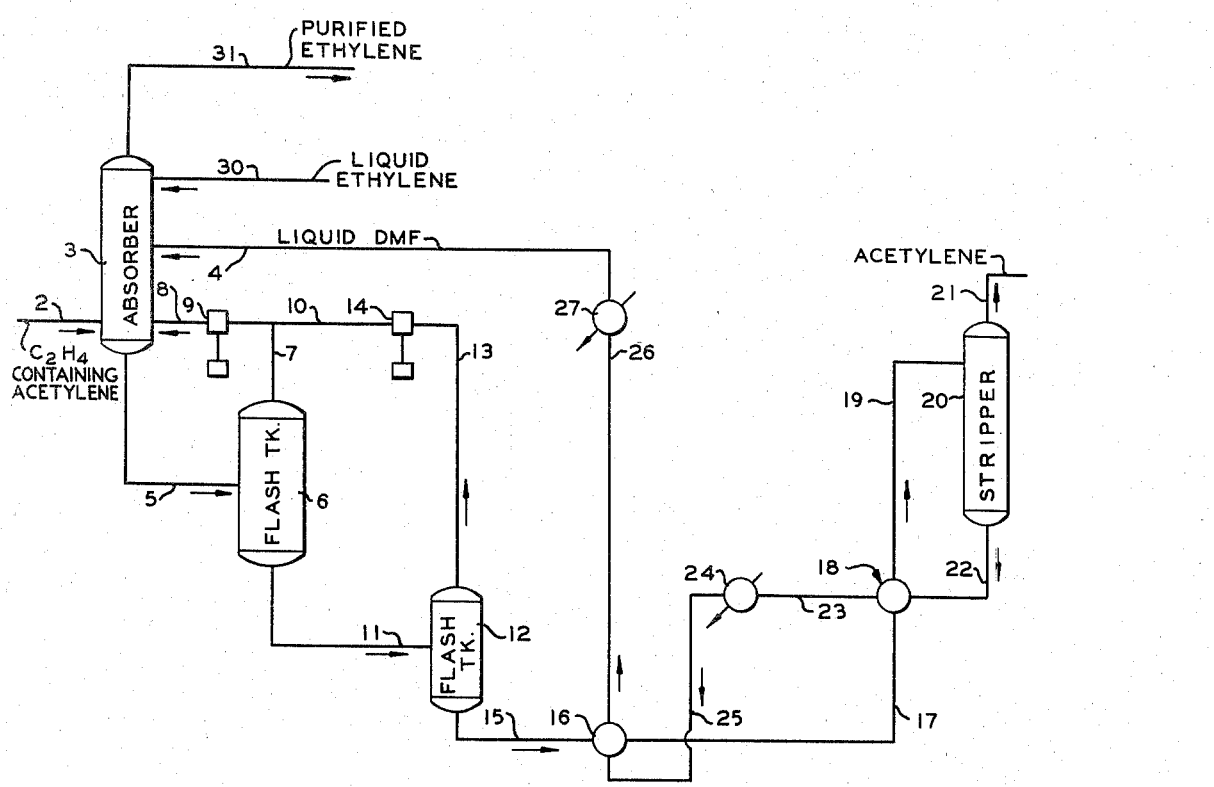

2,907,409
PURIFICATION OF GASES

Robert A. Koble, Bartlesville, Okla., assignor to Phillips Petroleum Company, a corporation of Delaware Application November 26, 1956, Serial No. 624,465

6 Claims. (Cl. 183—115)

This invention relates to the purification of gases. In one of its aspects, it relates to the purification of gases by contacting the same with a solvent selective for at least one of them, thus, obtaining a substantially purified off-gas and contacting said off-gas with a liquid material having essentially the chemical composition of at least a portion of said off-gas to dissolve from said off-gas, solvent which is entrained therein to obtain an off-gas substantially completely free from entrained solvent. In another aspect of the invention, there is employed as the liquid material of essentially the same chemical composition, an off-gas obtained from a later process in which the gases purified according to the invention are used. A further aspect involves the presaturation of the solvent with said liquid material. For example, in the purification of ethylene to remove acetylene therefrom, employing, say, dimethylformamide as a solvent, the entrained dimethylformamide is removed from the ethylene leaving the purification step by contacting the said ethylene with liquefied ethylene obtained from a polyethylene-producing step or zone. Also, the total amount of liquid ethylene introduced, whether into contact with said off-gas and/or elsewhere, is so adjusted in proportion that it is sufficient to saturate the dimethylformamide with respect to ethylene so that when said solvent contacts the ethylene-containing gas to be purified, it will be saturated with respect to ethylene.

It is known that when a gas is contacted with a liquid solvent selective for at least one of its components that the resulting off-gas, which is the gas produced when the gas leaves the liquid solvent, is saturated with solvent vapors or contains droplets of liquid solvent, or both, under the conditions of operation. In some instances, the loss of solvent is too great to be tolerated. In other instances, for example, in some processes which make use of the off-gas or pure gas, even a slight amount of entrained solvent is, for some reason, say, poisoning of catalyst, or production of an inferior product, undesired in the said gas.

It is an object of this invention to purify a gas, for example, ethylene. It is another object of this invention to so treat off-gas from a gas purification step as to dissolve from said off-gas solvent which is entrained therein to obtain an off-gas substantially completely free from entrained solvent. It is a further object of this invention to avoid heat of solution effects caused by solution of gas to be purified in the solvent with which it is contacted.

The invention will now be described in connection with a plant in which ethylene is purified by removing acetylene therefrom employing dimethylformamide as a solvent. It will be understood that the physical modus operandi set forth herein can be applied by one skilled in the art in possession of this disclosure to other purification operations.

According to this invention, the purification of a stream of a mixture of gases employing a selective solvent is accomplished by contacting said gases and said solvent to produce a purified off-gas which, however, as noted, will contain some entrained solvent either in the form of vapors or as droplets, or both. The entrained solvent is removed from the off-gas by contacting said off-gas with a liquefied portion of said off-gas. This liquefied portion of the off-gas can be obtained by merely liquefying the off-gas and returning it to the system as a material capable of removing the entrained solvent or it can be obtained from any other source as apparent from this disclosure.

In the drawing, there is shown, more or less diagrammatically, a flow plan illustrating an embodiment of the invention.

Ethylene containing some acetylene is fed by way of pipe 2 into tower 3 wherein it contacts cold liquid dimethylformamide introduced into tower 3 by way of pipe 4. This results in a bottoms liquid which is drawn off by way of pipe 5. This liquid contains dimethylformamide and acetylene. It may also contain dissolved ethylene. The liquid is passed to first flash drum 6 wherein gas is flashed to remove any ethylene by way of pipe 7 and pipe 10 which is returned to column 3 by way of compressor 9 and pipe 8. Bottoms from flash vessel 6 are passed by way of pipe 11 into second flash vessel 12 wherein the process of flashing is further conducted. An additional quantity of desirable ethylene is returned to tower 3 by way of pipe 13, compressor 14, pipe 10, compressor 9 and pipe 8. Bottoms from flash vessel 12 are passed by way of pipe 15, heat interchanger 16, pipe 17 and heat interchanger 18 and pipe 19 into stripper 20. In stripper 20, the dimethylformamide is freed of acetylene which is taken off overhead by way of pipe 21. The temperature in the bottom of the stripper in this embodiment will be approximately 340° F. Liquid dimethylformamide removed from the bottom of stripper 20 by way of pipe 22 is passed into heat interchanger 18 wherein it gives up some of its heat to the acetylene-rich dimethylformamide stream being passed to stripper 20. It then continues through pipe 23, trim cooler 24, pipe 25 and heat interchanger 16, pipe 26, cooler 27, through pipe 4 back to tower 3. It will be noted that pipe 4 communicates with tower 3 at a mid-point thereof. This, according to the invention, is so that the purified ethylene which leaves the solvent phase in tower 3 will have a substantial distance to travel in contact with liquid ethylene introduced by way of pipe 30 located substantially at the top of tower 3. The liquid ethylene passes downwardly over the trays in contact with the gaseous ethylene containing dimethylformamide, thus removing the solvent from the gaseous stream. Purified ethylene is removed as an overhead from tower 3 by way of pipe 31.

In the embodiment described, the ethylene which is contacted with the liquid ethylene will be essentially saturated with dimethylformamide at about 0° F. and 300 pounds per square inch absolute pressure which are the conditions at the solvent feed tray. The quantity of dimethylformamide which will be contained in the ethylene which is thus saturated with dimethylformamide will be more than can be tolerated in at least one process for the production of polyethylene employing a catalyst.

One method of removing dimethylformamide heretofore known is that in which a water scrubbing and subsequent drying are employed.

According to the present invention, the dimethylformamide in the effluent ethylene is reduced to an extremely low percentage, sufficiently low that no subsequent washing and drying steps are required. It is an essential advantage of the invention that the last contact of the ethylene is with dimethylformamide which is itself a very effective drying agent so that an extremely dry feed which is required for certain polyethylene operations is obtained. It will be noted, therefore, that there is an advantage in the present invention over that in which the effluent ethylene is water washed and, therefore, must be dried.

The liquid ethylene, upon entering the stage admitting dimethylformamide, serves to saturate the dimethylformamide. No intercooling is required since the liquid ethylene will dissolve with essentially no heat effect other than that of its heat of solution. The quantity of liquid ethylene admitted can be so controlled, according to the invention, that it matches that amount which is soluble in the dimethylformamide. If it is desired to employ less liquid ethylene, which would result in absorption of gaseous ethylene and, therefore, a heat effect, the dimethylformamide can be partially presaturated with additional quantities of liquid ethylene introduced at a suitable point.

EXAMPLE I

A feed stream having the following composition

| | Mols per day |
|---|---|
| Acetylene | 150 |
| Ethylene | 10,000 |
| Ethane | 90 |
| Total | 10,240 | is fed into the bottom of an absorber column such as absorber column 3, operated at 300 p.s.i.a. with a bottom tray temperature of 40° F. Dimethylformamide (anhydrous) is introduced at the 35th tray of absorber 3 at a rate of 6,800 mols per day. The solvent feed tray temperature is 5° F. A portion of the purified ethylene taken overhead from the column is liquefied and returned to the top of the column at a rate of 2,350 mols per day. This quantity of ethylene is just sufficient to saturate the liquid dimethylformamide leaving tray 35. The liquid on this tray contains 0.257 mol of ethylene and 0.743 mol of dimethylformamide, per mol of liquid, with traces of acetylene and ethane. The vapor leaving tray 35 has an equilibrium dimethylformamide content of 12 parts per million (molal basis). Five trays are provided above the solvent feed tray for contacting of the vapors with liquid ethylene, whereby the dimethylformamide content of the vapors is reduced to less than 1 part per million. Top tray temperature is −16° F.

Product stream compositions are:

*Bottoms product*

| | Mols per day |
|---|---|
| Acetylene | 178 |
| Ethylene | 1,350 |
| Ethane | Trace |
| Dimethylformamide | 6,800 |
| Total | 8,328 |

*Overhead product*

| | Mols per day |
|---|---|
| Acetylene (10 parts per million). | |
| Ethylene | 9,900 |
| Ethane | 90 |
| Dimethylformamide (less than 1 part per million). | |
| Total | 9,900 |

EXAMPLE II

The operation described in Example I is repeated, except that only 5 percent (117.5 mols per day) of the ethylene reflux is condensed and returned to the top of the column as liquid ethylene. The remaining 2,232.5 mols per day of ethylene is dissolved in the dimethylformamide solvent stream before it is introduced into the absorber. This method of operation has the advantage of reducing the load on the absorber overhead condenser.

EXAMPLE III

A feed stream comprising 99.5 mol percent propylene, 0.2 mol percent propane and 0.3 mol percent methylacetylene is introduced into a 53 tray absorber column operated at a pressure of 50 p.s.i.a., a bottoms temperature of 40° F. and a top temperature of 0° F. Dimethylformamide is introduced at a temperature of 40° F. on the 43rd tray of the column, at a rate of 94.6 mols of solvent per 100 mols of feed. The bottoms from the absorber column comprise 0.33 mol percent methylacetylene, 14.30 mol percent propylene, 85.37 mol percent dimethylformamide and a trace of propane. The composition of the overhead product is 50 parts per million methylacetylene, one part per million dimethylformamide, 99.8 mol percent propylene and 0.2 mol percent propane. Liquid propylene is returned to the top of the absorber column at a rate of 15.8 mols per 100 mols of feed, whereby the dimethylformamide content of the vapors is reduced from 324 parts per million at the solvent feed tray to one part per million in the overhead product.

Selective solvents which can be employed for the removal of acetylene and/or methylacetylene from olefins include, in addition to dimethylformamide, acetone, butyrolactone, N-methyl-2-pyrrolidone and dimethylsulfoxide. The invention is also applicable to the removal of diolefins from olefins, especially the separation of butadiene from butenes, employing either anhydrous or aqueous furfural as the solvent, to the separation of propylene from propane using dimethylformamide, and the separation of aromatic hydrocarbons from aliphatic hydrocarbons employing as solvent either diethylene glycol or triethylene glycol.

In Serial Number 567,876, filed February 27, 1956, by Robert A. Koble, now Patent No. 2,806,552, there is described and claimed a process for the separation of acetylene from a gaseous mixture containing acetylene and ethylene wherein the acetylene is absorbed in a solvent in the absorbing step, the acetylene is removed from the solvent in a stripping step and the stripped solvent and rich solvent are subjected to heat exchange relationship, the improvement comprising subjecting said stripped solvent to heat exchange in two separate steps and subjecting the stripped solvent to heat exchange with an extraneous cooling medium between said last-named heat exchange steps. It will be noted that cooler 24 in the drawing of the present application corresponds to the heat exchange with an extraneous cooling medium between two heat exchange steps effected between the stripped and the rich solvent. These two heat exchange steps are those performed in heat interchangers 16 and 18.

In this specification and in the claims, the terms "entrained" and "entrainment," used with reference to solvent contained in the off-gas leaving the liquid solvent, are intended to include solvent present therein in the form of vapors, liquid droplets, or both.

Reasonable variation and modification are possible within the scope of the foregoing disclosure, drawing and the appended claims to the invention the essence of which is that entrainment of solvent in the purification of a gas, substantially as described, is reduced or substantially eliminated by contacting said gas containing the entrained solvent with a liquid material having essentially the chemical composition of the said gas containing the said entrained material substantially as set forth and described herein.

I claim:

1. A method of removing entrained solvent from an off-gas obtained at a mid-point in an absorber zone, to which solvent is introduced from an external source at said mid-point, in which a gas stream to be purified is contacted with a solvent, thus purifying the same which comprises introducing into said zone a liquefied material having essentially the chemical composition of said off-gas in a manner and proportion such that at the point of contact of gas stream and introduced solvent, at said mid-point said liquefied material will be just sufficient to saturate said solvent with liquefied material at said mid-point, thus avoiding all heat effects other than any heat of solution of said liquefied material and of impurities removed from said gas stream in said solvent and avoiding absorption into said solvent of desired gas to be purified, said mid-point of said absorber zone being substantially removed from the point at which the gas stream to be purified is introduced to said absorber zone.

2. A method according to claim 1 wherein the liquefied material is introduced to the top of said zone in a quantity sufficient to remove entrained solvent from the purified off-gas and there is introduced at the point of contact of solvent and gas stream at said mid-point, additional quantity of said material such that the amount introduced at the top and at said point of contact at said mid-point together will be just sufficient to saturate said solvent with respect to the desired gas in said gas stream contacted with said solvent at said mid-point.

3. A method for the purification of a gaseous stream containing ethylene and acetylene which comprises, at a mid-point in an absorber zone, contacting a rising stream of gases with a solvent selective under the prevailing conditions for acetylene and introduced from an external point to said mid-point, thus obtaining an off-gas from which acetylene has been removed and making available at said mid-point liquid purified ethylene in an amount sufficient to saturate the solvent with liquid ethylene, thus avoiding heat effects other than solution of said liquid ethylene and gaseous acetylene and avoiding absorption of gaseous ethylene into said solvent, said mid-point of said absorber zone being substantially above the point at which the gaseous stream containing ethylene and acetylene is introduced to said absorber zone.

4. A method according to claim 3 wherein the liquid ethylene is introduced at the top of the absorber zone and is sufficient to wash from the off-gas entrained solvent therein and the solvent is introduced at a lower point and at said point there is made available to the solvent, additional liquid ethylene in an amount such that the total liquid ethylene at said lower point is sufficient to saturate the solvent with ethylene.

5. In the purification of a stream of a mixture of gases in an absorber zone in which a selective solvent is employed in contact with said mixture, to remove therefrom an undesired gas component thereof, and wherein there is introduced from a point external to said zone a solvent to a mid-point of said zone, thus obtaining an off-gas at said mid-point of said zone just immediately above the introduction of said solvent and wherein there is supplied to the purified gas removal end of said zone a liquefied material having essentially the chemical composition of at least a portion of said off-gas so that off-gas leaving said zone is contacted by said liquefied material, the improvement which comprises introducing said liquid material at the purified gas removal end of said zone in a proportion such that it will reach to the mid-point of said zone as a liquid in a quantity sufficient to substantially completely saturate the solvent introduced into said zone at said mid-point, thus avoiding all heat effects other than heat of solution of said undesired gas component and said liquefied material contacting said solvent at said mid-point and avoiding absorption into the solvent, as a gas, of the desired off-gas, said mid-point of said absorber zone being substantially removed from the point at which the mixture of gases to be purified is introduced to said absorber zone.

6. A purification according to claim 5 wherein the liquid material is liquid ethylene from which acetylene is removed by contact of a gaseous mixture containing ethylene and containing at least acetylene as an impurity with said solvent.

References Cited in the file of this patent

UNITED STATES PATENTS

| | | |
|---|---|---|
| 2,146,448 | Scott et al. | Feb. 7, 1939 |
| 2,366,360 | Semon | Jan. 2, 1945 |
| 2,374,984 | Evans et al. | May 1, 1945 |
| 2,486,543 | Wenzke | Nov. 1, 1949 |